(12) United States Patent
Engelen et al.

(10) Patent No.: US 11,592,726 B2
(45) Date of Patent: Feb. 28, 2023

(54) LIGHTING DEVICE COMPRISING LED AND GRATING

(71) Applicant: Lumileds LLC, San Jose, CA (US)

(72) Inventors: Rob Engelen, Eindhoven (NL); Varun Dev Kakkar, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 378 days.

(21) Appl. No.: 16/444,447

(22) Filed: Jun. 18, 2019

(65) Prior Publication Data

US 2019/0384141 A1 Dec. 19, 2019

(30) Foreign Application Priority Data

Jun. 18, 2018 (EP) .................................... 18178203

(51) Int. Cl.
*G03B 15/06* (2021.01)
*G03B 35/00* (2021.01)

(52) U.S. Cl.
CPC .............. *G03B 15/06* (2013.01); *G03B 35/00* (2013.01)

(58) Field of Classification Search
CPC ........ G03B 15/06; G03B 15/07; G03B 35/00; G02B 5/006
See application file for complete search history.

(56) References Cited

U.S. PATENT DOCUMENTS

| | | |
|---|---|---|
| 5,581,352 A | 12/1996 | Zeien |
| 9,098,931 B2 | 8/2015 | Shpunt et al. |
| 9,423,246 B2 | 8/2016 | Yu et al. |
| 11,150,088 B2 | 10/2021 | Schrama et al. |
| 2004/0264350 A1* | 12/2004 | Ueki ................. G02B 5/3058 369/112.16 |
| 2007/0057946 A1 | 3/2007 | Albeck et al. |
| 2007/0296920 A1 | 12/2007 | Mezouari et al. |

(Continued)

FOREIGN PATENT DOCUMENTS

| | | |
|---|---|---|
| CN | 1965590 A | 5/2007 |
| CN | 103226009 A | 7/2013 |

(Continued)

OTHER PUBLICATIONS

International Search Report and Written Opinion issued in PCT Application No. PCT/US2020/032416 dated Aug. 13, 2020; 12 pages.

(Continued)

*Primary Examiner* — Minh Q Phan

(57) ABSTRACT

The invention refers to a lighting device comprising at least one light emitting diode (LED). The object to provide a lighting device that is capable of providing a light pattern for illuminating an object in 3D imaging, wherein the lighting device is simple and cost-effective to manufacture, while the lighting device may in addition have a very small form factor, is solved in with a lighting device comprising: at least one LED for emitting light towards a light-emitting side; a first grating with a regular pitch having light-blocking sections and light-permeable sections; wherein the first grating is arranged on the light-emitting side to block the passage of light at the light-blocking sections, such that the light passing the light-permeable sections is capable to illuminate an object with a line pattern. The invention further corresponds to a method for producing a lighting device and the use of a lighting device.

18 Claims, 6 Drawing Sheets

(56) References Cited

U.S. PATENT DOCUMENTS

| | | |
|---|---|---|
| 2010/0303341 A1 | 12/2010 | Häusler |
| 2011/0163336 A1 | 7/2011 | Peng et al. |
| 2014/0340484 A1* | 11/2014 | Pfister .................. H04N 13/254 |
| | | 348/46 |
| 2016/0335492 A1 | 11/2016 | Chern et al. |
| 2017/0038505 A1 | 2/2017 | Chern et al. |
| 2017/0322424 A1 | 11/2017 | Rossi |
| 2018/0293790 A1 | 10/2018 | Darwin |
| 2019/0049097 A1 | 2/2019 | Rossi et al. |
| 2019/0098276 A1 | 3/2019 | Duggan et al. |
| 2019/0129085 A1 | 5/2019 | Waldern et al. |
| 2019/0131771 A1 | 5/2019 | Wan et al. |
| 2021/0223568 A1* | 7/2021 | Makinen ................ H04N 13/32 |

FOREIGN PATENT DOCUMENTS

| | | |
|---|---|---|
| CN | 210323605 U | 4/2020 |
| EP | 1785693 A1 | 5/2007 |
| EP | 2363686 A1 | 9/2011 |
| EP | 2770365 A1 | 8/2014 |
| TW | I436030 B | 5/2014 |
| WO | 2018111423 A1 | 6/2018 |

OTHER PUBLICATIONS

Lilienblum Erik et al., "A Structured Light Approach for 3-D Surface Reconstruction With a Stereo Line-Scan System", IEEE Transactions on Instrumentation and Measurement, IEEE Service Center, Piscataway, NJ, US, vol. 64, No. 5, May 1, 2015 (May 1, 2015), pp. 1266-1274, XP011577379.

Merlo Sabine et al., "Infrared structured light generation by optical MEMS and application to depth perception", 2017 IEEE International Workshop on Metrology for Aerospace (Metroaerospace), IEEE, Jun. 21, 2017 (Jun. 21, 2017), pp. 518-522, XP033135233.

USPTO Notice of Allowance in U.S. Appl. No. 16/871,741 dated Jun. 22, 2021, 6 pages.

The extended European Search Report, EP18178203.8, dated Oct. 19, 2018, 7 pages.

Opto Engineering: "Ed optics", Oct. 29, 2013, pp. 1-16, XP055513339, https://www.1stvision.com/lens/opto_eng/media/downloads/docks/3d_optics_en.pdf.

Morimoto et al., "Shape Measurement by Light-stepping Method Using LEDs", Optomechatronic Technologies (ISOT), 2010 International Symposium ON, IEEE, Piscataway, NJ, USA, Oct. 25, 2010, pp. 1-6, XP031849037.

From the EPO as the ISA, "Notification of Transmittal of the International Search Report and the Written Opinion of the International Searching Authority, or the Declaration", PCT/EP2019/064610, dated Sep. 5, 2019, 16 pages.

* cited by examiner

LIGHTING DEVICE COMPRISING LED AND GRATING

FIELD OF INVENTION

The present disclosure relates to lighting devices comprising light emitting diodes (LEDs), in particular in the area of pattern illuminators for 3D imaging purposes.

BACKGROUND

Applications involving 3D imaging have become increasingly important. Such applications are also provided in consumer electronics such as mobile devices, creating the need of 3D imaging devices with very small form factors. In particular the available height for installation in emitting direction is limited.

A basic method of acquiring a 3D representation of an object in 3D imaging is based on an active illumination of the object, wherein the object is illuminated with a specifically structured light pattern. An optical sensor such as a camera is used to obtain a 2D image of the object illuminated by the light pattern. The shape of the object distorts the observed light pattern, such that a 3D representation of the object can be derived from the 2D image.

A typical light pattern used for illumination of objects in 3D imaging is a dot pattern, which can be for instance a regular, pseudo-random or random dot pattern. Such patterns can be produced by lasers, e.g. by edge emitters or vertical-cavity surface-emitting lasers (VCSEL arrays). While such lighting devices for illumination in 3D imaging can in principle have small form factors and can be included in mobile devices, these lighting devices are usually complex and difficult to manufacture, therefore increasing production costs.

Further types of light patterns that may be used for illumination in 3D imaging include crosses, grids, and lines. However, such light patterns are also usually obtained by means of laser devices and the corresponding lighting devices can therefore be cost-intensive.

SUMMARY

It is therefore an object of the present invention to provide a lighting device that is capable of providing a light pattern for illuminating an object in 3D imaging, wherein the lighting device is simple and cost-effective to manufacture, while the lighting device may in addition have a very small form factor, in particular a small installation height in emitting direction. The invention further relates to a method for producing such a lighting device and a use of such a lighting device based on the aforementioned object.

According to a first aspect of the present invention, a lighting device is provided comprising: at least one light emitting diode (LED) for emitting light towards a light-emitting side; a first grating with a regular pitch having light-blocking sections and light-permeable sections; wherein the first grating is arranged on the light-emitting side to block the passage of light at the light-blocking sections, such that the light passing the light-permeable sections is capable to illuminate an object with a line pattern. The first grating is configured such that light rays of certain angles are blocked, while light rays of other angles may pass the first grating through the light-permeable sections, to create a shadowing effect.

According to a second aspect of the present invention, a method for producing a lighting device is provided, the method comprising: providing at least one LED for emitting light towards at least one light-emitting side; providing a first grating with a regular pitch having light-blocking sections and light-permeable sections; and arranging the first grating on the light-emitting side such that the passage of light at the light-blocking sections is blocked and that the light passing the light-permeable sections is capable to illuminate an object with a line pattern. The first grating is configured such that light rays of certain angles are blocked, while light rays of other angles may pass the first grating through the light-permeable sections, to create a shadowing effect.

According to a third aspect of the present invention, a use of a lighting device according to the first aspect is provided to provide a light pattern in 3D imaging of objects.

Exemplary embodiments of the first, second and third aspect of the invention may have one or more of the properties described below.

The at least one LED may comprise at least one semiconductor element such as a p-n-junction, a diode, and/or a transistor. For instance, the at least one LED may be at least partially arranged on a substrate. The at least one LED is configured to emit light towards a light-emitting side of the lighting device. The light-emitting side may represent one or more areas of or around the lighting device, wherein an object that is to be illuminated by the lighting device can be brought to the light-emitting side for illumination.

The first grating has a regular pitch, wherein the pitch may be understood as the period of the grating, i.e. the sum of the width of a single light-blocking section and the width of a single light-permeable section. Light-blocking sections and light-permeable sections may be considered to form "lines" of the grating in that the light-blocking sections and light-permeable sections have longitudinal directions with a largest dimension. The width of the light-blocking sections and light-permeable sections may be understood as the dimension perpendicular to the longitudinal direction and within the grating. The first grating may in particular have a planar shape. Sufficiently wide light-permeable sections, in combination with the light-blocking sections, will cause a shadowing effect, according to the principles of Moiré Shadow. Instead, narrow light-permeable sections will result in a diffraction pattern. The diffraction pattern requires high manufacturing accuracy and has the drawback to be wavelength depending and therefore to be light source dependent. Light-permeable sections of intermediate width, will cause a dominant shadowing effect with a superposed diffraction pattern, the Talbot effect. The first grating of the invention is configured to cause a dominant shadow effect with possibly a minor diffraction pattern of lower intensity superposed. With diminishing width of the light permeable section the shadow contrast will improve.

A "regular" pitch may in this context be understood in that the pitch of each line of the grating is equal within the manufacturing precision of the grating. A regular pitch of the grating has the advantage that the line pattern produced by the lighting device may also be (approximately) a regular line pattern with a regular pitch of dark and bright lines, which can be easier to detect and to analyse for purposes of 3D imaging of objects.

The first grating is arranged on the light-emitting side to partially block the passage of light at the light-blocking sections, such that the light passing through the light-permeable sections is capable to illuminate an object with a line pattern.

The light-blocking sections of the first grating are considered to create a shadowing effect on the light impinging on the first grating, such that light rays, e.g. of certain angles, are blocked, while light rays of other angles may pass the first grating through the light-permeable sections. The light impinging on the first grating may be directly emitted by the LED or may be redirected to the first grating. The first grating therefore may be considered to form a (regular) fan of light rays, wherein dark lines occur at certain angles.

The first grating may be arranged in the "far field" of the at least one LED, i.e. the distance of the at least one LED and the first grating is large enough that the light rays emitted by the LED reach the first grating as (essentially) parallel light rays. Preferably, the LED may be considered to be a point light source with respect to the first grating. The light-blocking sections of the first grating may then also be considered to create a shadowing effect on the light impinging on the first grating, such that a (regular) array of essentially parallel light rays is produced, wherein dark lines occur. Preferably, the dimensions of the LED may be smaller than the dimensions of the first grating.

The lighting device according to the first aspect therefore relies on simple and widely available elements such as LEDs and gratings to provide a line pattern, significantly reducing the production costs. In particular, LEDs and corresponding gratings may be provided with very small dimensions, such that the form factor of the lighting device may be significantly reduced. No further complicated and space consuming optical elements in the light emitting path are required to obtain a regular array of essential parallel light rays. Such optical elements may however be provided in order to improve intensity and contrast of the line pattern caused by the shadow effect.

In an exemplary embodiment of the invention, the lighting device further comprises at least one optical element arranged to refract and/or reflect light towards the first grating. With at least one optical element, light rays that otherwise would miss the first grating can be redirected towards the first grating, therefore enhancing the intensity of the light that is passing the first grating and improving the intensity of the illumination of an object with a line pattern. Light that is redirected by the at least one optical element may comprise light emitted by the LED in directions that do not correspond to the position of the first grating. Light that is redirected by the at least one optical element may also comprise light that is reflected on the first grating, e.g. blocked by the light-blocking sections of the first grating, or that is reflected by other elements of the lighting device. Overall, the probability of a light ray passing through the first grating may be enhanced in that the at least one optical element may redirect a light ray towards the first grating, wherein the light ray would otherwise not pass the first grating.

Further, the at least one optical element may be considered to provide an optical projection such as a collimation of the light rays being directed towards the first grating or the light rays passing the first grating. For instance, a reflective element such as a mirror element or a refracting element such as a lens may form an essentially parallel light beam being directed towards the first grating, such that the first grating receives a "far field" emission from the at least one LED, while the distance between the at least one LED and the first grating may be reduced. For instance, a reflective element such as a mirror element or a refracting element may also be arranged on the side of the first grating facing away from the at least one LED, such that the light passing through the first grating may be projected on an object.

In an exemplary embodiment of the invention, the at least one optical element is configured as a reflector cup, white LED package, TIR lens and/or Fresnel lens for the at least one LED.

A reflector cup may effectively reflect light emitted from the LED towards the light-emitting side and the first grating. The reflector cup may be configured as element with high (specular and/or diffuse) reflectance that surrounds the at least one LED at least on one side. The reflector cup may have a shape that is adapted to the geometry of the spatial distribution of light emission of the at least one LED, such that the amount of light redirected towards the first grating is further optimized. The reflector cup may for instance be configured to provide an essentially parallel light beam on the first grating. The LED and the reflector together may be considered to configure a point light source with respect to the first grating. In an embodiment, the reflector cup may also serve as support for the first grating, such that the lighting device can be arranged in a very compact manner.

The at least one optical element may configured as a white LED package for the at least one LED, wherein the white LED package for instance comprises "white" walls encapsulating the at least one LED with highly reflective material. The white LED package may comprise side walls for the at least one LED and in particular comprise a lead frame for the at least one LED coated with a highly reflective material. As reflective material, polymer materials as e.g. silicone may be used, wherein reflective particles such as $TiO_x$ particles are embedded in the polymer material. The white LED package may form a highly reflective environment of the LED and encapsulate the LED, wherein light essentially only may exit towards the first grating.

A lens for the LED, preferably a total internal reflection (TIR) lens and/or Fresnel lens, may provide an optical projection of the light emitted by the LED and reflected within the lighting device. For instance, a TIR lens or Fresnel lens may provide a collimation of light towards the first grating to improve contrast and intensity of the line pattern. TIR lenses and Fresnel lenses in particular allow reducing the form factor of the lighting device.

In another exemplary embodiment of the invention, the lighting device further comprises at least one second grating with a regular pitch having light-blocking sections and light-permeable sections; wherein the at least one second grating is arranged in between the at least one LED and the first grating. With at least one second grating, the distance between the at least one LED and the first grating can be further reduced. The light-permeable sections of the second grating each function as a point light source for the first grating and therefore a large distance between the LED and the first grating is not required. Moreover, this overcomes the requirement of a single grating in that the light rays emitted by the LED have to reach the first grating as (essentially) parallel light rays. Accordingly, in combination with the second grating, also an array or matrix of LEDs may be used. In particular, the light-blocking sections of the at least one second grating can be considered to create a shadowing effect on the light impinging on the at least one second grating, such that light rays of certain angles are blocked, while light rays of other angles may pass the at least one second grating to the first grating. The first grating creates a shadowing effect as described above. The at least one second grating and the first grating therefore interact to select certain angles for light rays to pass the gratings, while at other angles, light rays are blocked at the at least one second grating or the first grating. In particular, combining the first grating with the at least one second grating may produce a line pattern also for non-parallel light rays, such that the gratings can be brought very close to the LED to further reduce the form factor of the lighting device, while a line pattern with sufficient contrast can be produced. The at least one second grating has in particular the same pitch as the first grating.

The lighting device may comprise at least one transparent carrier on the light-emitting side of the LED. For instance, the at least one transparent carrier may comprise or consist of glass and/or transparent plastics material. In an exemplary embodiment of the invention, the first grating and/or at least one second grating may be disposed on a surface of the at least one transparent carrier. Therefore, the at least one transparent carrier may serve as a support for the first grating and/or at least one second grating. For instance, a first grating and/or at least one second grating may be formed on the at least one transparent carrier, in particular by an application of stripes on a surface of the at least one transparent carrier, wherein the stripes form light-blocking sections of the first grating and/or at least one second grating. In particular, metallic stripes may be applied to the at least one transparent carrier. For instance, gold, silver, aluminium, copper and/or their alloys may be used as material for the metallic stripes. The first grating and/or at least one second grating may be formed by a coating process such as sputtering and/or evaporation on the at least one transparent carrier. The first grating and/or at least one second grating may for instance have a thickness perpendicular to the surface of the transparent carrier of 100 nm to 500 nm, in particular 150 nm to 250 nm.

In an exemplary embodiment of the invention involving at least one second grating, the first grating and the at least one second grating are disposed on opposite sides of the at least one transparent carrier, for instance on opposite sides of a glass carrier and/or transparent plastic carrier. The first grating and the at least one grating can therefore be provided in a single element and can be manufactured in a simple manner. For instance, the gratings are formed by (metallic) stripes on surfaces on opposite sides of the at least one transparent carrier.

A protective coating may be applied to the transparent carrier, in particular on the side of the transparent carrier on which the first grating and/or the at least second grating is disposed, wherein the protective coating may cover and/or embed the first and/or at least second grating. The protective coating may for instance comprise or consist of $SiO_2$ and/or $Si_3N_4$. The thickness of the protective coating perpendicular to the surface of the transparent carrier may be at least one order of magnitude larger than the thickness of the grating(s). For instance, the grating may have a thickness of 150 nm to 250 nm, in particular 200 nm, and the transparent carrier and the grating is covered with a protective coating with a thickness of 1 µm, wherein the grating is situated completely inside the protective coating.

As already indicated above, in some embodiments of the invention at least part of the light-blocking sections of the first grating and/or the at least one second grating is reflective for the light emitted by the LED, in particular specular reflective. For instance, the light blocking sections may be formed by metallic stripes being reflective. Reflective properties of the first grating and/or the at least one second grating may lead to an increase in intensity for the line pattern, as light is reflected and redirected from the light-blocking sections of the grating(s) and therefore may pass through the first grating after reflection. In particular, combining reflecting light-blocking sections of the grating(s) with at least one optical element such as a reflector cup or a white LED package may significantly increase the intensity output of the lighting device, as a large part of the light emitted by the LED is reflected until the light passes the first grating to produce the line pattern.

In case aluminium is used as material for the metallic stripes, wherein in particular aluminium is evaporated on the at least one transparent carrier, the side of the metallic stripes that is in contact to the at least one transparent carrier can have essentially specular reflective properties, while the side of the metallic stripes facing away from the at least one transparent carrier may be subject to surface oxidation and therefore have a matte surface, being less specular reflective and having at least partially diffuse reflective properties. Hence, depending on which side is chosen for the first grating, the side of the first grating facing the LED will have specular reflective properties or partially diffuse reflective properties. In case the first grating and the at least one second grating are disposed on opposite sides of the at least one transparent carrier, the side of the second grating facing the LED has partially diffuse reflective properties. This may be advantageous in that the light blocked by the metallic stripes is reflected at least partially in a diffuse manner (i.e. with a distribution of different reflection angles) and may be again reflected in the lighting device, e.g. by an optical element such as a reflector cup or white LED package. The side of the second grating facing the at least one transparent carrier is specular reflective, such that light is reflected back towards the first grating.

In some embodiments, the following combination of reflective surfaces of the first and at least one second grating may be chosen: the surface of the light-blocking sections of the at least one second grating facing the LED may be have a higher reflectivity than the surface of the light-blocking sections of the at least one second grating facing the light-emitting side. With this, light blocked by the at least one second grating coming from the LED is reflected back into the lighting device and may pass the first grating after another reflection. A highly reflective surface of the at least one second grating facing the LED therefore enhances efficiency. Light impinging on the light-blocking sections of the at least one second grating facing the light-emitting side (i.e. on the side facing away from the LED), however, has already been reflected from the first grating and may be considered to have a direction of propagation that does not match the first grating and therefore the line pattern. It is therefore beneficial when the surface of the light-blocking sections of the at least one second grating facing the light-emitting side has a lower reflectivity.

Preferably, the surface of the light-blocking sections of the first grating facing the LED (and the at least one second grating) may have specular reflectivity. As light being blocked by the first grating after passing the second grating may be consider to have a direction of propagation that does not match the line pattern, it is beneficial to reflect this light back through the at least one second grating into the lighting device, such that it is reflected again (e.g. at an optical element) and may change its direction of propagation. With the surface of the light-blocking sections of the first grating facing the LED being specular reflective, the probability that the light passes the at least second grating again without being blocked is increased, enhancing the efficiency of the lighting device.

According to another exemplary embodiment of the invention, at least one surface of the first grating and/or at least one surface of the at least one second grating may have a light redirecting structure. In particular, the surface of the first grating and/or at least one second grating that faces the at least one LED may have a light redirecting structure, in particular in addition to reflective properties such as specular reflective properties. As the at least one LED itself may have light absorbing properties, it is beneficial that light being blocked on the first grating and/or at least one second grating is not redirected towards the LED where it might be absorbed, but towards other parts of the lighting device where the probability for a reflection of light is higher, e.g. towards at least one optical element such as a reflector cup or white LED package.

In some embodiments, a surface of the first grating and/or at least one second grating may be shaped as a light redirecting structure, i.e. the light redirecting structure is formed by the surface of the grating itself. For instance, the surface of a grating may be shaped as a curved or angled surface. In some embodiments, at least one light redirecting element may be used and may in particular be disposed on a surface of the first grating and/or at least one second grating, in particular on a flat and (specular) reflective surface of the first grating and/or at least one second grating. A light redirecting element may be a refracting element such as a transparent element with a triangular or (half-) circular cross section, which for example redirects light being reflected at the surface of the grating towards a direction that is closer to a direction parallel to the grating. In particular, the shape of the light redirecting element is configured to redirect the light away from the at least one LED. The light redirecting structure may also vary over the area of the grating, e.g. the light redirecting structure may be different at the center of the grating (where the grating is directly opposite of the LED) from the periphery of the grating (where the grating is opposite of an optical element).

While it is possible to choose the pitch of the first and/or at least one second grating such that diffraction effects are minor, the pitch of the first and/or at least one second grating are preferably chosen such that diffraction grating effects are moderate at the wavelengths of the light emitted by the at least one LED. For example, a contrast of 80% in the line pattern (i.e. the relative difference between maximum and minimum intensity) without diffraction effects could be reduced to around 50% due to single slit diffraction.

According to another exemplary embodiment of the invention, the first grating is configured to cause a diffraction pattern on the intensity of the light passing through the first grating, the diffraction pattern comprising transmission angles with intensity maxima and intensity minima; and wherein the first grating and the at least one second grating are arranged such that intensity maxima of the line pattern coincide with maxima of the diffraction pattern and/or intensity minima of the line pattern coincide with minima of the diffraction pattern. In particular, the pitch and/or distance of the first and/or at least one second grating may also be chosen such that diffraction grating effects enhance the illuminated line pattern, e.g. the contrast of the line pattern. The width of light-permeable sections the first and/or at least one second grating may be chosen such that single slit diffraction effects enhance the illuminated line pattern and, for instance, the contrast between illuminated and dark lines in the line pattern.

For instance, the light-permeable sections of the first grating are configured to cause a diffraction grating pattern on the intensity of the light passing through the first grating, the diffraction grating pattern comprising transmission angles with intensity maxima and intensity minima; and wherein the first grating and the at least one second grating are arranged such that intensity maxima of the line pattern coincide with maxima of the diffraction grating pattern and/or intensity minima of the line pattern coincide with minima of the diffraction grating pattern. For instance, a distance between the first and the at least one second grating and/or the pitch of the at least one second grating is chosen such that transmission angles with intensity maxima of the diffraction grating pattern coincide with connecting angles between light-permeable sections of the at least one second grating and light-permeable sections of the first grating. For instance, the connecting angles are equal to all or some of the intensity maxima, such as every n-th maxima.

For instance, the light-permeable sections of the first grating are configured to cause a single-slit diffraction pattern on the intensity of the light passing through the first grating, the single-slit diffraction pattern comprising transmission angles with intensity maxima and intensity minima; and wherein the first grating and the at least one second grating are arranged such that intensity maxima of the line pattern coincide with maxima of the single-slit diffraction pattern and/or intensity minima of the line pattern coincide with minima of the single-slit diffraction pattern. For instance, a distance between the first and the at least one second grating and/or width of light-blocking sections of the at least one second grating is chosen such that transmission angles with intensity maxima of the single-slit diffraction pattern coincide with connecting angles between light-permeable sections of the at least one second grating and light-permeable sections of the first grating. For instance, the connecting angles are equal to all or some of the intensity maxima, such as every n-th maxima.

Matching transmission angles of the intensity maxima caused by diffraction effects with connecting angles between light-permeable sections may increase the contrast and intensity of the illuminated line pattern. In particular, the amount of light being blocked by the light-blocking sections of the first grating is reduced.

In some embodiments, the pitch of the first grating and/or the pitch of the at least one second grating is from 1 μm to 200 μm. In other embodiments, the pitch of the first grating and/or the pitch of the at least one second grating is from 5 μm to 50 μm. These pitch sizes allow obtaining a large number of lines in the pattern and therefore a high resolution in 3D imaging also with small sizes of the lighting device. Further, the pitch sizes may only lead to moderate diffraction effects, e.g. with light in the visible and/or near infrared range.

In some embodiments, the first grating and/or the at least one second grating has a coverage of light-blocking sections of 25% to 75%. That is, 25% to 75% of the area of the grating is formed by light-blocking sections. The coverage may in particular be 30% to 70% or 40% to 60%. In some embodiments, the coverage is 50%, i.e. half of the grating has of light-blocking properties.

In some embodiments, the first grating and/or the at least one second grating may have different coverages of light-blocking sections. The at least one second grating may have in particular a smaller coverage than the first gratings. For instance, the coverage of the at least one second grating is 30%, while the coverage of the first grating is 70%. However, preferably the first grating and/or the at least one second grating have the same coverage, with the coverage being in particular from 40% to 60% or 50%.

According to another exemplary embodiment of the invention, a distance between the first and the at least one second grating is from 0.2 mm to 2 mm, in particular from 0.5 mm to 1.0 mm. These distances allow for a high contrast in the line pattern while still providing a lighting device with small sizes.

According to another exemplary embodiment of the invention, the lighting device further comprises a substrate for the at least one LED, wherein the substrate, the at least one optical element form an integrated component. Optionally the integrated component may also be formed by the first grating and/or at least one second grating. In this manner, a very compact and stable device can be produced. In particular, the at least one optical element is configured as a white LED package, which may be formed integrated with the substrate, e.g. by gluing or overmolding. The substrate may be configured as an LED lead frame, forming an overmolded or glued lead frame with the at least one optical element. Further, at least one transparent carrier may be also integrated in the component, including at least one second grating and/or the first grating. The substrate, e.g. the lead frame may be coated with a highly reflective material, such as polymer materials (e.g. silicone) with embedded reflective particles (e.g. $TiO_x$ particles).

According to another exemplary embodiment of the invention, the lighting device further comprises a housing for an electronic device on the light-emitting side of the LED; wherein the first grating is formed in an aperture of the housing. The housing may be configured to enclose an electronic device, for instance a camera, a computer, a Thinclient and/or a portable computer (mobile device), such as a laptop computer, a tablet computer, a wearable, a personal digital assistant or a smartphone. The housing may also be configured to enclose the lighting device. An aperture is formed in the housing, e.g. by openings or slits in the material of the housing. The housing of electronic devices may also comprise a transparent material such as transparent plastics material and may be coated with a light-blocking coating such as paint for decorative or functional purposes. The coating may form the light-blocking sections of the first grating, while sections of the housing are left uncoated to form the light-permeable sections of the first grating.

By integrating the first grating in the housing, the size and production costs of the lighting device can be further reduced. When at least one second grating is used, the at least one second grating may be disposed on a transparent carrier that may form an integrated component with the at least one LED as described above, while the first grating is formed in the aperture of the housing.

In principle, a variety of wavelength ranges is possible for the light being emitted by the at least one LED and being used to produce the line pattern. In some embodiments, the at least one LED is configured to emit light comprising wavelengths in the UV range, in the visible range and/or in the near-infrared range. The UV range may in particular correspond to wavelengths of 315 and 380 nm The visible range may in particular correspond to wavelengths of 380 nm to 750 nm and the near-infrared range to wavelengths of 750 nm to 1100 nm. In particular, wavelengths of 315 nm to 1100 nm may be used.

In a particular configuration with a first and a second grating, with a grating pitch p=12.9 μm, a distance d=1.0 mm between the first and the second grating and a refractive index n=1.51 of the material between the first and the second grating, for a LED light source with λ=950 nm, a spectral width of 50 nm and a Lambertian emission profile, the distance in angle between consecutive peaks of the shadow pattern is 1.11° ($\alpha_s = n_c * \tan^{-1}(p/d) = 1.11°$). The distance in angle between consecutive peaks of the diffraction pattern is 4.18° ($\alpha_d = \sin^{-1}(\lambda/p)$). The shadow pattern is clearly dominant over the diffraction pattern.

According to the first aspect of the invention, also an electronic device is provided comprising a lighting device according to the first aspect, in particular wherein the electronic device is configured for 3D imaging of an object based on an illumination with the line pattern produced by the lighting device. The electronic device may in this sense be a camera, a computer, a Thinclient and/or a mobile device, such as a laptop computer, a tablet computer, a wearable, a personal digital assistant or a smartphone, for example.

The electronic device in particular comprises an optical sensor capable of obtaining a 2D image of an object illuminated with the line pattern. The electronic device may further comprise a data processing installation capable of obtaining 3D data of the surface of an object from a 2D image.

The features and example embodiments of the invention described above may equally pertain to the different aspects according to the present invention. In particular, with the disclosure of features relating to the lighting device according to first aspect also corresponding features relating to a method for production according to the second aspect and to the use according to the third aspect are disclosed.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

Examples of the invention will now be described in detail with reference to the accompanying drawing, in which.

DETAILED DESCRIPTION OF THE PREFERRED EMBODIMENTS

Figure 1:
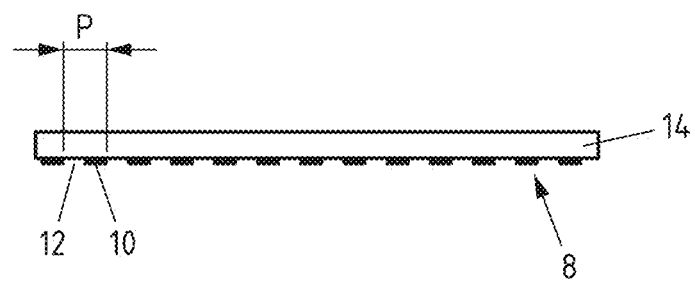
FIG. 1 schematically shows elements of a lighting device according to a first embodiment of the invention.
Figure 1:
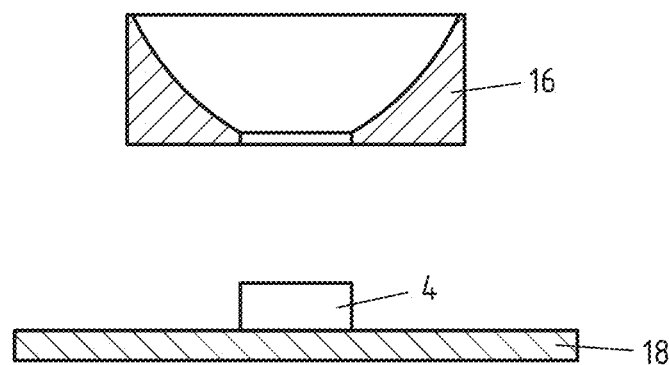

FIG. 1 schematically shows elements of a lighting device according to a first embodiment of the invention. An LED package 4 comprises at least one LED and is disposed on a substrate 18 comprising a printed circuit board (PCB) to provide contacts for the LED package 4. Further, an optical element 16 is provided, such as a reflector cup for the LED package 4. As another element for the lighting device, FIG. 1 shows a first grating 8 being disposed on a surface of a transparent carrier 14, which is for instance a glass carrier. The first grating 8 and the transparent carrier 14 may be coated with a protective coating (not shown). The first grating 8 has a regular pitch p, which is indicated by the sum of the width of a light-blocking section 10 and a light-permeable section 12 of the first grating 8.

Figure 2:
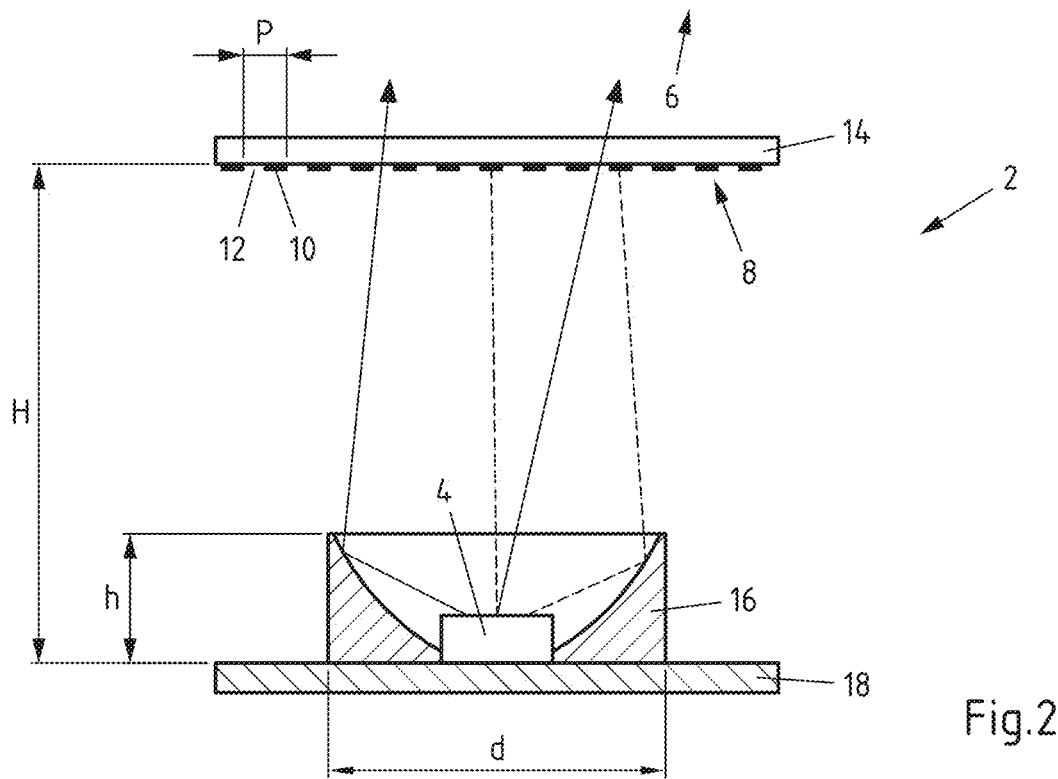
FIG. 2 schematically shows a lighting device according to a first embodiment of the invention.

FIG. 2 schematically shows a lighting device 2 according to a first embodiment of the invention comprising the elements depicted in FIG. 1. The optical element 16 is arranged to reflect light towards the first grating 8, being disposed on the substrate 18 and surrounding the LED package 4, such that light emitted from the LED package 4 is reflected towards the first grating 8 while also providing a collimation of light towards the first grating 8.

The first grating 8 is arranged to partially block the passage of light at the light-blocking sections 10. This is illustrated in FIG. 2, wherein the dashes lines represent light paths being blocked by the light-blocking sections 10. In this embodiment, the light-blocking sections 10 are made of a light-absorbing material, such that the corresponding light rays are absorbed. As light rays pass the light-permeable sections 12, for which light paths are illustrated by the solid lines in FIG. 2, the partial absorption of light at the light-blocking sections 10 leads to a shadowing effect. That is, light rays with certain angles may pass the first grating 8, while light rays with other angles are blocked. The lighting device 2 is capable to illuminate an object with a line pattern.

Figure 3:
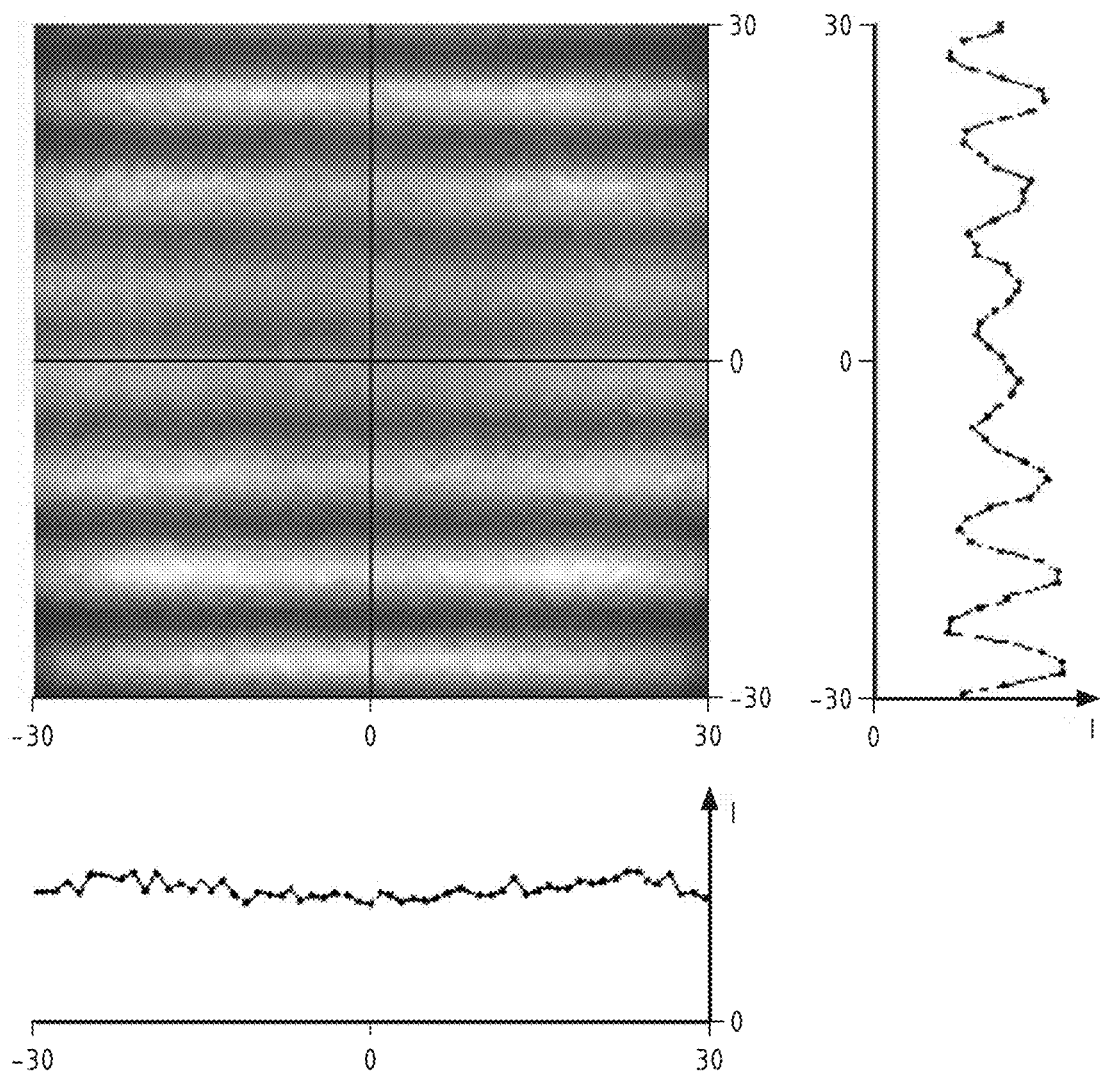
FIG. 3 depicts a line pattern and intensity distributions as obtained by the lighting device according to the embodiment shown in FIG. 2.

This is demonstrated in FIG. 3, which shows results of a model calculation for the intensity of the light passing the grating 8 to the light-emitting side 6 depending on the observation angle, wherein an angle of zero corresponds to a direction of observation perpendicular to the plane of the first grating 8. For the calculation, a grating pitch of p=50 μm, a width for the optical element of d=3 mm and height for the optical element of h=2 mm and a distance between the substrate 18 of the LED 4 to the transparent carrier 14 and first grating 8 of d=10 mm have been assumed.

As can be seen in FIG. 3, a line pattern with high contrast and approximately regular angular pitch between light and dark stripes is obtained. The intensity depending on the angle is plotted on the right hand side (perpendicular to the lines of the first grating 8 with the other angle being zero) and the bottom of FIG. 3 (parallel to the lines of the first grating 8 with the other angle being zero), respectively.

In this embodiment, the optical element 16 embodied as a reflector cup effectively reflects light emitted from the LED 4 towards the light-emitting side 6 and the first grating 8. The optical element 16 also projects the light onto the first grating 8, while the irradiance flatness of the LED 4 can be increased by the optical element 16. With this, the overall intensity of the line pattern as well as the contrast, especially in the center of the line pattern, can be improved.

Figure 4:
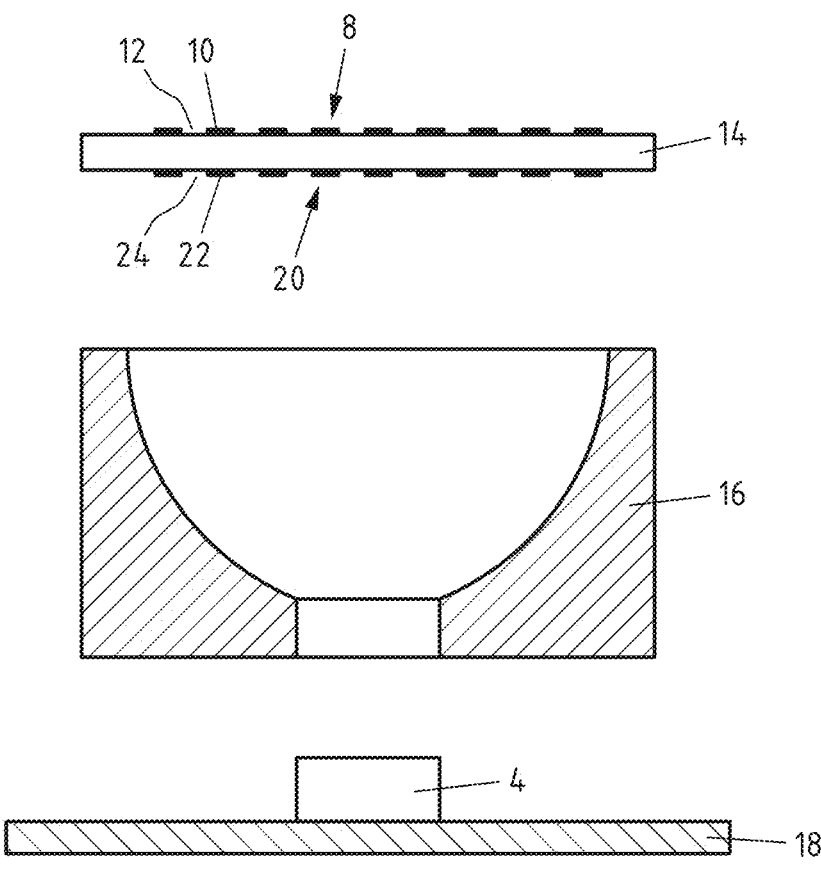
FIG. 4 schematically shows elements of a lighting device according to a second embodiment of the invention.

FIG. 4 schematically shows elements of a lighting device according to a second embodiment of the invention. An LED package 4 comprises at least one LED and is disposed on a substrate 18 comprising a printed circuit board (PCB). Further, an optical element 16 configured as reflector cup for the LED package 4 is provided. A first grating 8 as well as a second grating 20 are disposed on respective surfaces of a transparent carrier 14, which is for instance a glass carrier. First grating 8 and second grating 20 are disposed on opposite sides of the transparent carrier 14. The transparent carrier 14 may be coated with a protective coating (not shown), e.g. on both sides, covering the first grating 8 and second grating 20.

Figure 5:
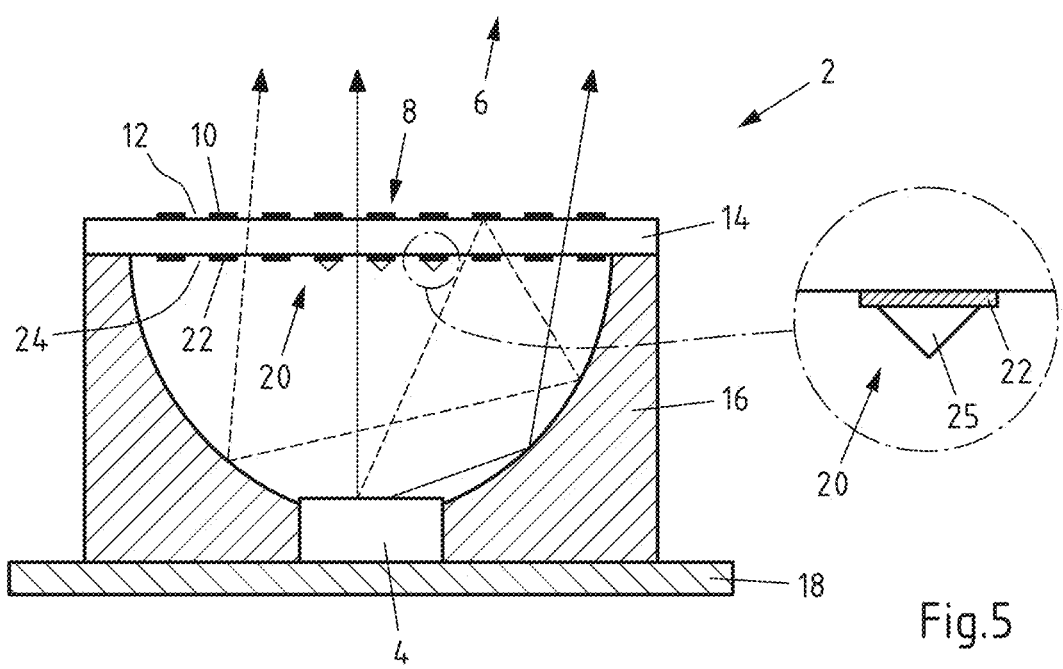
FIG. 5 schematically shows a lighting device according to a second embodiment of the invention.

FIG. 5 schematically shows a lighting device 2 according to a second embodiment of the invention comprising the elements depicted in FIG. 4. The optical element 16 configured as a reflector cup is arranged to reflect light towards the first grating 8.

The second grating 20 has a regular pitch with light-blocking sections 22 and light-permeable sections 24. The second grating 20 is arranged in between the LED 4 and the first grating 8.

The first grating 8 and the second grating 20 may for instance be formed by metallic stripes such as aluminium stripes on the surface of the transparent carrier 14, such that the light-blocking sections 10, 22 of the first grating 8 and the second grating 20 are reflective for the light emitted by the LED 4. In particular, as in the case of metallic stripes formed by aluminium, the side of the light-blocking sections 10, 22 that faces the transparent carrier 14 is specular reflective, while the other side may have partially diffuse reflective properties. The second grating 20 has the same pitch as the first grating 8.

With the second grating 20, the distance between the LED 4 and the first grating 8 can be reduced to improve the form factor, while the contrast of the light pattern can be enhanced. The light-blocking sections 22 of the second grating 20 create a shadowing effect on the light such that only certain light paths may pass to the first grating 8, as is illustrated by the light paths depicted as solid lines in FIG. 2. The second grating 20 and the first grating 8 therefore interact to produce a line pattern. In this embodiment, the first grating 8 and the second grating 20 have an identical coverage of light-blocking sections 10, 22 of 40% to 60%, in particular 50%.

Further, due to the reflecting nature of the first grating 8, second grating 20, and optical element 16, light that does not pass the first grating 8 directly after emission from the LED 4, is reflected and may pass the first grating 8 after reflection. Such a light path is illustrated by the dashed line in FIG. 5. In particular, with the combination of a reflective first grating 8, second grating 20, and optical element 16, the total intensity of the line pattern can be significantly enhanced.

The surface of the light-blocking sections 22 of the second grating 20 facing the LED may have a higher reflectivity than the surface facing the light-emitting side 6. Further, the surface of the light-blocking sections 10 of the first grating 8 facing the second grating 20 may have specular reflectivity, such that the probability that the light passes the second grating 20 again without being blocked is increased.

Further, as shown in the enlarged view in FIG. 5, the surface of the second grating 20 that faces the LED package 4 has a light redirecting structure 25. A light redirecting transparent element with a triangular cross section is disposed on the reflective surface of the light-blocking section 22, such that light from the light-blocking section 22 is redirected away from a direction towards the LED package 4, which can have partially light absorbing properties. The light is therefore not absorbed at the LED package 4, but is reflected again by the optical element 16.

Figure 6:
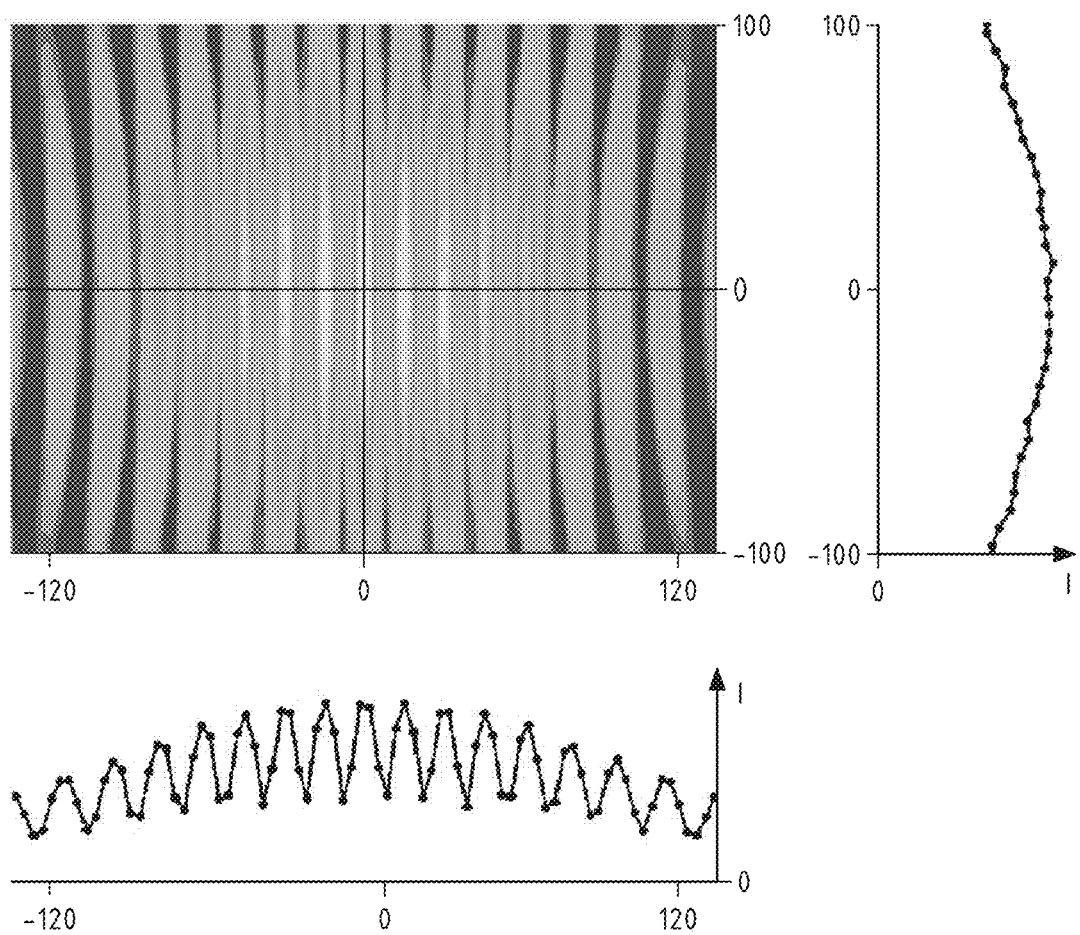
FIG. 6 depicts a line pattern and intensity distributions as obtained by the lighting device according to the embodiment shown in FIG. 5.

A line pattern that can be produced by the embodiment of the lighting device 2 shown in FIG. 5 is depicted in FIG. 6, together with diagrams of spatial intensity distributions. FIG. 6 shows the results of model calculations for an LED package 4 with an optical element 16 with a size of 3.0 mm×3.0 mm, a transparent carrier 14 with a thickness of 1.0 mm made of N-BK7 glass, and a pitch of p=50 μm for both the first grating 8 and the second grating 20. Diffraction effects have been simulated by a Gaussian transmission profile with □=0.5°. The LED package 4 is considered to emit light in the near infrared range.

FIG. 6 shows the intensity of the line pattern on a screen with a distance to the lighting device 2 of 200 mm. The intensity is plotted depending on the position of the screen in mm, wherein (0, 0) corresponds to the center of the screen. As can be seen from FIG. 6, a line pattern with high contrast and an approximately regular pitch is obtained. Such a light pattern can also be observed for several distances of the screen and the lighting device 2, such as 400 mm and 600 mm.

Figure 7:
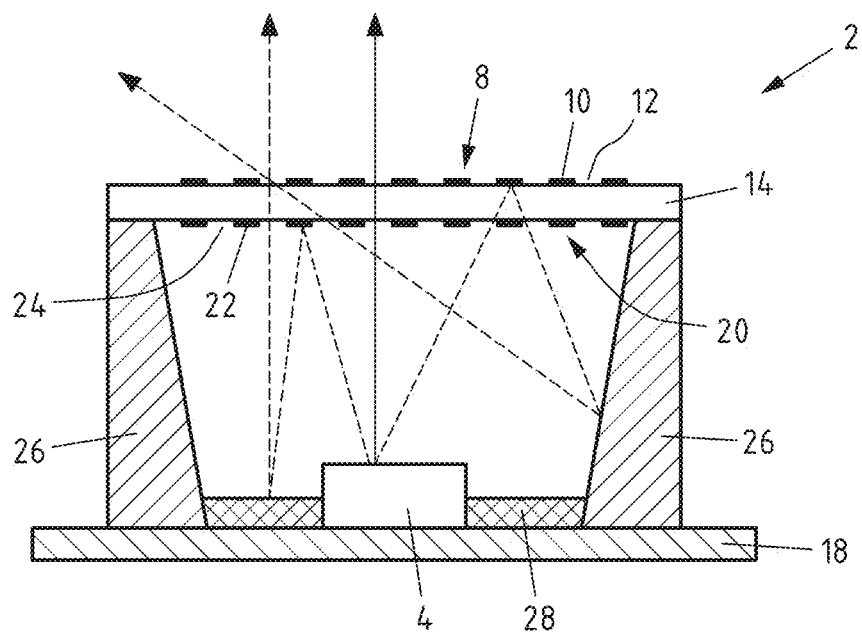
FIG. 7 schematically shows a lighting device according to a third embodiment of the invention.

FIG. 7 schematically shows a lighting device 2 according to a third embodiment of the invention. This embodiment of the lighting device 2 is similar to the lighting device 2 shown in FIG. 5 and corresponding reference numerals have been used. The substrate 18 is integrated with an optical element 16 and configured as lead frame, which can be for example overmolded or glued. The white LED package comprises walls 26 made of a highly reflective material. The surface of the substrate 18 is partially covered with a reflective coating 28 made of silicone with $TiO_x$ particles. The space in between the substrate 18, walls 26, and the transparent carrier 14 may be completely or partially filled with a transparent material such as silicone. The substrate 18 and the optical element 16 form an integrated component together with the transparent carrier 14, the first grating 8 and the second grating 20.

FIG. 7 further illustrates light paths for light passing the first grating 8 after emission by the LED package 4 (solid line) and for light being reflected within the lighting device 2 before passing the first grating 8 (dashed lines). As the white LED package essentially provides a highly-reflective environment encapsulating the LED package 4, wherein light may only exit the lighting device 2 towards the light emitting side 6, the overall intensity of the line pattern is improved.

Figure 8:
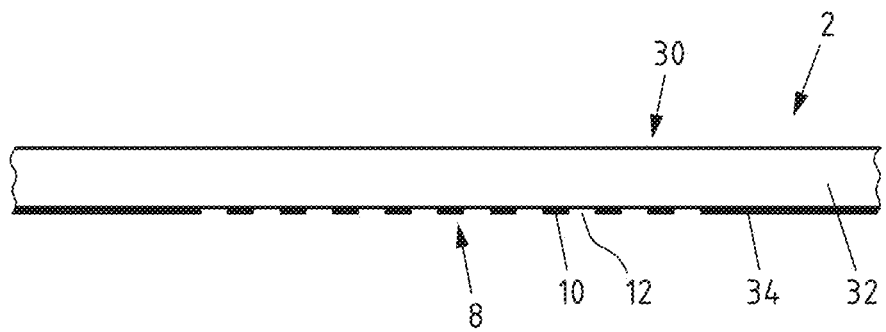
FIG. 8 schematically shows a lighting device according to a fourth embodiment of the invention.
Figure 8:
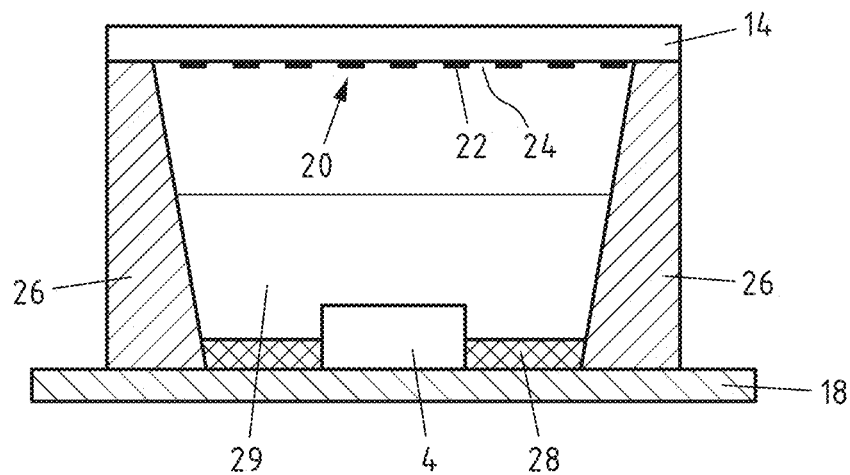

FIG. 8 schematically shows a lighting device 2 according to a fourth embodiment of the invention. The lighting device 2 comprises a substrate 18 and optical element 16 configured as white LED package. The space between substrate 18, LED package 4 and optical element 16 is partially filled with transparent silicone 29.

Substrate 18, optical element 16 and transparent carrier 14 with second grating 20 form an integrated component as already described in reference to the embodiment shown in FIG. 7. However, the first grating 8 is formed in an aperture of a housing 30 for an electronic device. The housing 30 comprises a light-permeable body 32 which is coated with light-blocking paint 34. The first grating 8 is formed in an aperture of the housing 30, wherein part of the light-permeable body 32 is left uncoated to provide light-permeable sections 12. By integrating the first grating 8 in the housing 30, production of the lighting device 2 can be simplified. In such embodiments, a larger grating pitch for the first grating 8 and second grating 20 of 100 μm to 200 μm may be used. With this embodiment, the distance between first grating 8 and second grating 20 may be large, such that angular features in the line pattern are smaller and the resolution in 3D imaging can be improved.

Figure 9:
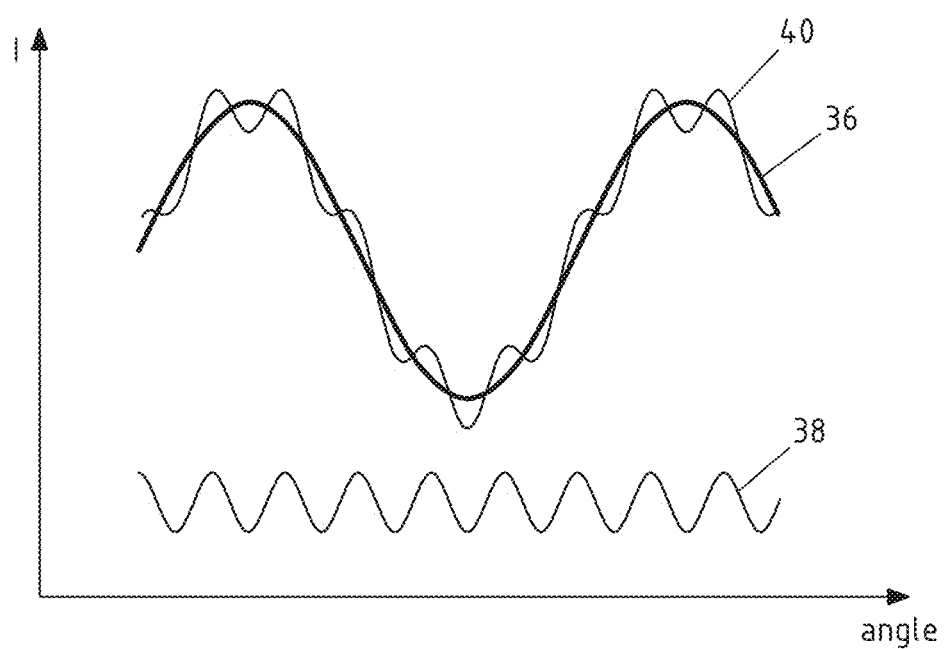
FIG. 9 schematically shows an angular intensity distribution with diffraction effects.

In some embodiments of the lighting device according to the present invention, diffraction effects may be used to improve the contrast of the line pattern. In this regard, FIG. 9 schematically shows an intensity distribution I as a function of angle. Curve 36 indicates the intensity distribution that would arise due to the shadowing effects at the first grating without diffraction effects.

For example, the first grating may be configured to cause a diffraction pattern on the intensity of the light passing through the first grating with the diffraction pattern comprising transmission angles with intensity maxima and minima as shown in curve 38. The diffraction pattern may for example be based on diffraction grating effects and/or single-slit diffraction effects.

First grating and the second grating may be arranged such that for instance intensity minima of the line pattern coincide with minima of the diffraction pattern. The resulting total intensity of the line pattern therefore has a higher contrast as illustrated by means of curve 40 in FIG. 9.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

What is claimed is:

1. A lighting device to provide a light pattern in 3D imaging of objects comprising:
   at least one light emitting diode (LED) for emitting light towards a light-emitting side; and
   a first grating with a regular pitch having light-blocking sections and light-permeable sections, at least part of the light-blocking sections of the first grating is reflective for the light emitted by the LED;
   a second grating arranged with the LED to have the first grating between them, the second grating having a regular pitch with light-blocking sections and light-permeable sections, at least part of the light-blocking sections of the second grating being reflective for the light emitted by the LED, the second grating arranged on the light-emitting side of the lighting device such that light rays of certain angles are blocked at the light-blocking sections to create a shadowing effect, while light rays of other angles pass the second grating through the light-permeable sections to form a line pattern, the line pattern having a diffraction pattern comprising transmission angles with intensity maxima and intensity minima, the first grating and the second grating being arranged such that intensity maxima of the line pattern coincide with at least one of a maxima of the diffraction pattern and/or intensity minima of the line pattern coincide with minima of the diffraction pattern;
   and
   a reflective optical element for reflecting light towards the first and second grating.

2. The lighting device according to claim 1, further comprising at least one optical element arranged to refract light towards the second grating.

3. The lighting device according to claim 2, wherein the at least one optical element is configured as one of a TIR lens and a Fresnel lens for the at least one LED.

4. The lighting device according to claim 2, further comprising a substrate for the at least one LED, wherein the substrate, the at least one optical element, and the second grating form an integrated component.

5. The lighting device according claim 1, wherein at least part of the light-blocking sections of the second grating is specular reflective for the light emitted by the at least one LED.

6. The lighting device according to claim 1, wherein the second grating has a same pitch as the first grating.

7. The lighting device according to claim 6, further comprising at least one transparent carrier on the light-emitting side of the at least one LED;
   wherein the second grating is disposed on one side of the at least one transparent carrier.

8. The lighting device according to claim 7, further comprising the second grating; wherein the first grating and the second grating are disposed on opposite sides of the at least one transparent carrier.

9. The lighting device according to claim 6, wherein at least one of an at least one surface of the first grating and at least one surface of the second grating has at least one light redirecting structure.

10. The lighting device according to claim 6, wherein at least one of a pitch of the first grating and the pitch of the second grating is from 1 µm to 200 µm.

11. The lighting device according to claim 6, wherein a distance between the first grating and the second grating is from 0.2 mm to 2 mm.

12. The lighting device according to claim 1, further comprising a housing for an electronic device on the light-emitting side of the at least one LED,
   wherein the second grating is formed in an aperture of the housing.

13. The lighting device according claim 1, wherein the at least one LED is configured to emit light comprising wavelengths in an ultraviolet range, the visible range and/or in a near-infrared range.

14. A lighting device to provide a light pattern in 3D imaging of objects comprising:
   at least one light emitting diode (LED) for emitting light towards a light-emitting side; and
   a first grating with a regular pitch having light-blocking sections and light-permeable sections, a first surface of the light-blocking sections of the first grating being reflective for the light emitted by the LED, the light-blocking sections of the first grating comprising a second surface opposite the first surface having lower reflectivity than the first surface,
   a second grating arranged with the LED to have the first grating between them, the second grating having a regular pitch with light-blocking sections and light-permeable sections, at least part of the light-blocking sections of the second grating being reflective for the light emitted by the LED, the second grating arranged on the light-emitting side of the lighting device such that light rays of certain angles are blocked at the light-blocking sections to create a shadowing effect, while light rays of other angles pass the second grating through the light-permeable sections to form a line pattern;
   and
   a reflective optical element for reflecting light towards the first and second grating.

15. An electronic device comprising:
   a lighting device including
      at least one light emitting diode (LED) for emitting light towards a light-emitting side;
      a first grating with a regular pitch having light-blocking sections and light-permeable sections, at least part of the light-blocking sections of the first grating is reflective for the light emitted by the LED;
      a second grating arranged with the LED to have the first grating between them, the second grating having a regular pitch with light-blocking sections and light-permeable sections, at least part of the light-blocking sections of the second grating being reflective for the light emitted by the LED, the second grating arranged on the light-emitting side of the lighting device such that light rays of certain angles are blocked at the light-blocking sections to create a shadowing effect, while light rays of other angles pass the second grating through the light-permeable sections to form a line pattern, the line pattern having a diffraction pattern comprising transmission angles with intensity maxima and intensity minima, the first grating and the second grating being arranged such that intensity maxima of the line pattern coincide with at least one of a maxima of the diffraction pattern and/or intensity minima of the line pattern coincide with minima of the diffraction pattern;
      and
      a reflective optical element for reflecting light towards the first and second grating;
   the electronic device being configured for 3D imaging of an object based on an illumination with the line pattern produced by the lighting device.

16. The lighting device according to claim 1, further comprising a carrier, wherein the carrier is transparent and the carrier is provided with the second grating.

17. The light device according to claim 16, wherein the first grating and the second grating are provided on opposite sides of the carrier.

18. The lighting device according to claim 16, wherein the carrier is comprised of at least one of glass and plastic.

* * * * *